(12) United States Patent
Balestrazzi et al.

(10) Patent No.: US 10,063,409 B2
(45) Date of Patent: Aug. 28, 2018

(54) MANAGEMENT OF COMPUTING MACHINES WITH DYNAMIC UPDATE OF APPLICABILITY RULES

(71) Applicant: International Business Machines Corporation, Armonk, NY (US)

(72) Inventors: Luca Balestrazzi, Rome (IT); Fabio De Angelis, Rome (IT); Andrea Napoleoni, Arsoli (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 14/942,037

(22) Filed: Nov. 16, 2015

(65) Prior Publication Data

US 2017/0141946 A1    May 18, 2017

(51) Int. Cl.
*H04L 12/24* (2006.01)

(52) U.S. Cl.
CPC ...... *H04L 41/0803* (2013.01); *H04L 41/0686* (2013.01)

(58) Field of Classification Search
CPC .................. H04L 41/0803; H04L 41/0686
See application file for complete search history.

(56) References Cited

U.S. PATENT DOCUMENTS

| | | | |
|---|---|---|---|
| 7,624,086 B2 | 11/2009 | Keith, Jr. | |
| 2004/0010584 A1* | 1/2004 | Peterson | H04L 41/046 709/224 |
| 2004/0085227 A1* | 5/2004 | Mikuriya | G01C 21/32 340/995.14 |
| 2004/0210653 A1* | 10/2004 | Kanoor | G06F 8/65 709/223 |
| 2006/0253760 A1* | 11/2006 | Jones | G06F 11/0709 714/741 |
| 2008/0140836 A1* | 6/2008 | Miyawaki | A63F 13/12 709/225 |
| 2010/0094977 A1* | 4/2010 | Velupillai | H04L 41/0681 709/220 |

* cited by examiner

*Primary Examiner* — Dustin Nguyen
*Assistant Examiner* — Javier O Guzman
(74) *Attorney, Agent, or Firm* — Terrile, Cannatti & Chambers LLP; Stephen A. Terrile (57) ABSTRACT

A method for managing a plurality of computing machines comprises deploying an indication of a management activity having an applicability rule to selected one or more of the computing machines to cause each of the selected computing machines fulfilling the applicability rule to execute the management activity on the selected computing machine, receiving an error message for each failure computing machine of the selected computing machines wherein the execution of the management activity has failed, determining at least one relevant property of each failure computing machine among a plurality of selected properties of the computing machines according to the corresponding error message, collecting a value of at least part of the selected properties for at least part of the computing machines, the values of the selected properties comprising a failure value of each relevant property for each failure computing machine, and updating the applicability rule according to the failure values.

17 Claims, 7 Drawing Sheets

MANAGEMENT OF COMPUTING MACHINES WITH DYNAMIC UPDATE OF APPLICABILITY RULES

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the management of computing machines.

The management of computing machines plays a key role in several contexts, especially in large organizations wherein their number may become very high (for example, up to some hundreds of thousands). For this purpose, various resource management tools are available for facilitating the management of the computing machines; a commercial example of these resource management tools is IBM BigFix by IBM Corporation (trademarks).

The resource management tools may be based on policies. Each policy indicates a management activity that has to be executed on the computing machines to make them compliant therewith (for example, the application of a patch to a software program); the policies are deployed to the computing machines, wherein they are applied by executing the corresponding management activities. This reduces the administrative effort required to manage the computing machines, since the focus is shifted from their management at an individual level to the definition of the policies at an aggregated level. Generally, each policy also indicates an applicability rule thereof (for example, the availability of a specific operating system); the policy is then applied only on the computing machines that fulfill its applicability rule. This allows executing the management activities efficiently where they are actually relevant.

However, the definition of the applicability rule of each policy may be quite difficult and time consuming. For example, US-A20150178060 discloses a computer implemented method including the steps of identifying prerequisites (i.e., software and hardware components) of a software application that are present in source code of the software application and creating a prerequisite checklist that includes the identified prerequisites of the software application, wherein the prerequisite checklist is in a file format that is compatible with prerequisite checking software. However, this technique is complex and not of general applicability.

The definition of the applicability rule of each policy substantially remains a manual task, which strongly depends on personal skills and experience (and then it is prone to human errors). Therefore, the application of the policy may fail on several computing machines wherein it had not to be applied. A troubleshooting of the failures should then be performed in an attempt to identify these computing machines and then correct the applicability rule accordingly. For example, U.S. Pat. No. 7,624,086 discloses interrogating computer systems prior to software installations to ensure software installations operate correctly and do not conflict with existing hardware and software. An agent application is first installed on a user's system; when a new program is about to be installed on the user's system, the agent checks if certain prerequisite requirements are met. The prerequisite requirements are downloaded from an expert system library, and the agent interrogates the user's system to determine if it passes the downloaded requirements; if the system passes, then the software is installed. If the system does not pass, then a report is sent to the user and/or a remediation script is initiated to repair the problem. After software is installed, if errors arise that were not previously detected, a feedback mechanism sends the errors to the expert system library so future errors are detected preemptively.

In any case, the troubleshooting is a quite complex process. Indeed, the troubleshooting at first requires identifying the (alleged) cause of each failure, for example, with a process of elimination. An update of the applicability rule that avoids the application of the policy on the computing machines wherein it is likely that it was applied by mistake is determined; the applicability rule is updated accordingly and verified for its correctness. However, this process may be time consuming and expensive, especially when a high number of failures has occurred.

All of the above may have a detrimental effect on the whole management of the computing machines.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of updating the applicability rule dynamically.

Particularly, an aspect provides a method for managing a plurality of computing machines, wherein at least one relevant property of each failure computing machine (wherein an execution of a management activity has failed) is determined according to a corresponding error message, and an applicability rule of the management activity is updated according to a failure value of each relevant property for each failure computing machine.

A further aspect provides a software program and a software program product for implementing the method.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE SEVERAL VIEWS OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
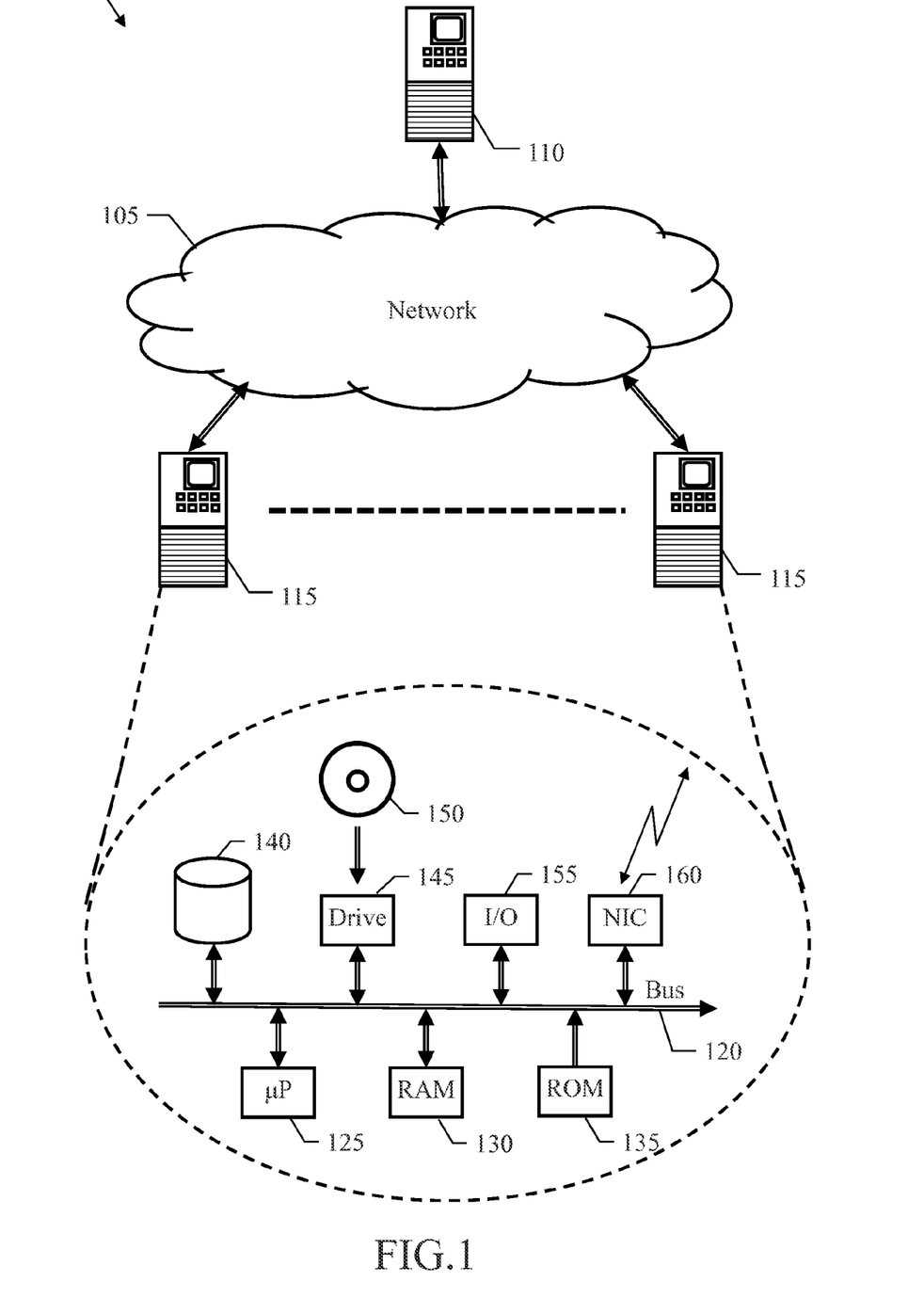
FIG. 1 shows a schematic block-diagram of a computing system wherein the solution according to an embodiment of the present disclosure may be implemented.

With reference in particular to FIG. 1, a schematic block-diagram is shown of a computing system 100 wherein the solution according to an embodiment of the present disclosure may be implemented.

Particularly, the computing system 100 has a distributed architecture, wherein multiple computing machines are connected among them through a communication network 105 (for example, an enterprise intranet). One of the computing machines (or more), referred to as server computing machine (or simply server) 110, controls the management of the other computing machines, referred to as target computing machines (or simply targets) 115.

Each (server/target) computing machine 110,115 comprises several units that are connected in parallel to a bus structure 120 (with an architecture that is suitably scaled according to the actual function of the computing machine 110,115). In detail, a Central Process Unit (CPU) comprises one or more microprocessors (PP) 125 that control operation of the computing machine 110,115; a RAM 130 is used as a working memory by the microprocessors 125, and a ROM 135 stores basic code for a bootstrap of the computing machine 110,115. The computing machine 110,115 is also provided with a mass-memory comprising one or more hard-disks 140 and drives 145 for reading/writing removable storage units 150 (for example, optical disks). Moreover, the computing machine 110,115 has input/output (I/O) units 155 (for example, a keyboard, a mouse, and a monitor). A network adapter (NIC) 160 is used to connect the computing machine 110,115 to the network 105.

Moving to FIGS. 2A-2D, an exemplary application is shown of the solution according to an embodiment of the present disclosure.

Figure 2A:
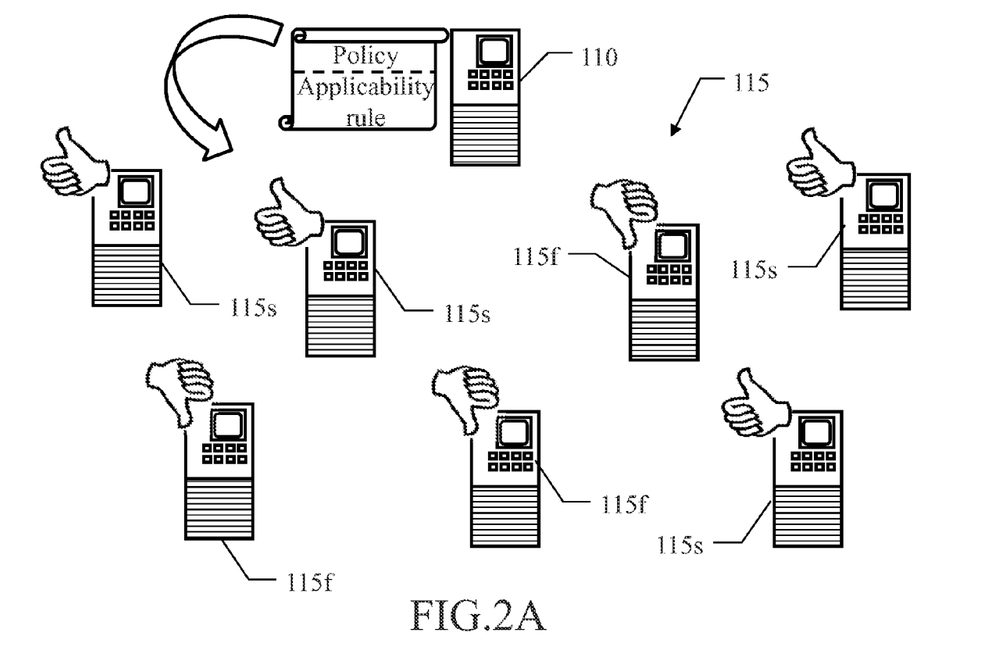
FIGS. 2A-2D show an exemplary application of the solution according to an embodiment of the present disclosure.

Starting from FIG. 2A, an indication of a management activity having an applicability rule is deployed to one or more selected targets 115 (for example, a significant subset thereof); this causes each selected target 115 fulfilling the applicability rule to execute the management activity on the selected target 115. For example, this result is achieved by deploying a corresponding policy by the server 110 for its application on the selected targets 115. The application of the policy may succeed on some of the selected targets 115 (denoted with a thumb-up symbol and hereinafter referred to as success targets 115s) and it may fail on some others of the selected targets 115 (denoted with a thumb-down symbol and hereinafter referred to as failure targets 115*f*).

Figure 2B:
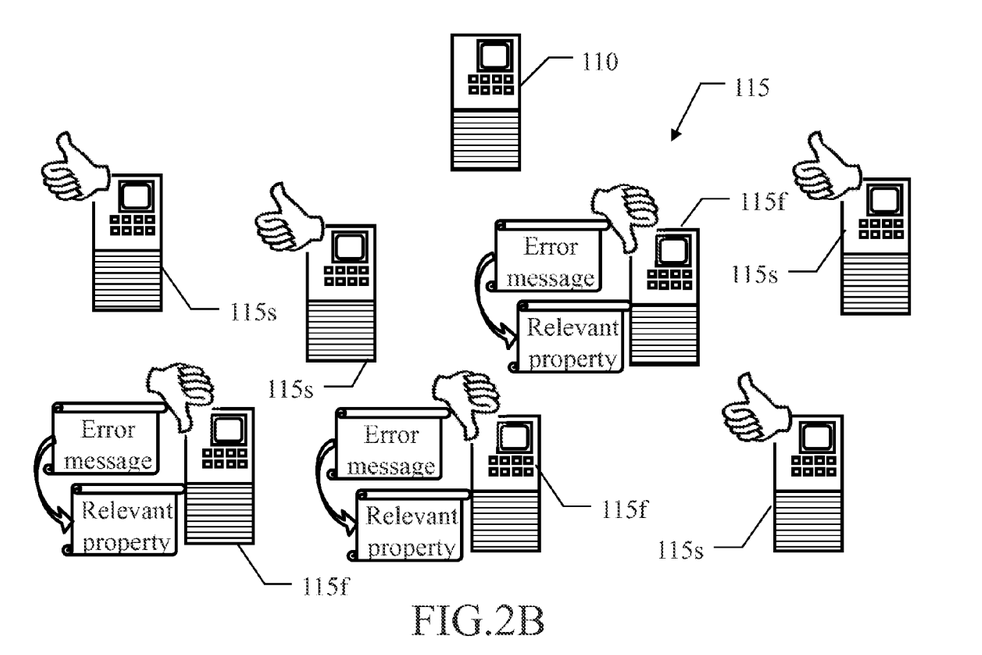

Passing to FIG. 2B, an error message (indicative of the corresponding failure) is received for each failure target 115*f*. A relevant property (or more) of each failure target 115*f* is determined among a plurality of selected properties of the targets 115 (for example, CPU, operating system, user); the relevant property is determined according to the corresponding error message (for example, by searching corresponding keywords therein).

Figure 2C:
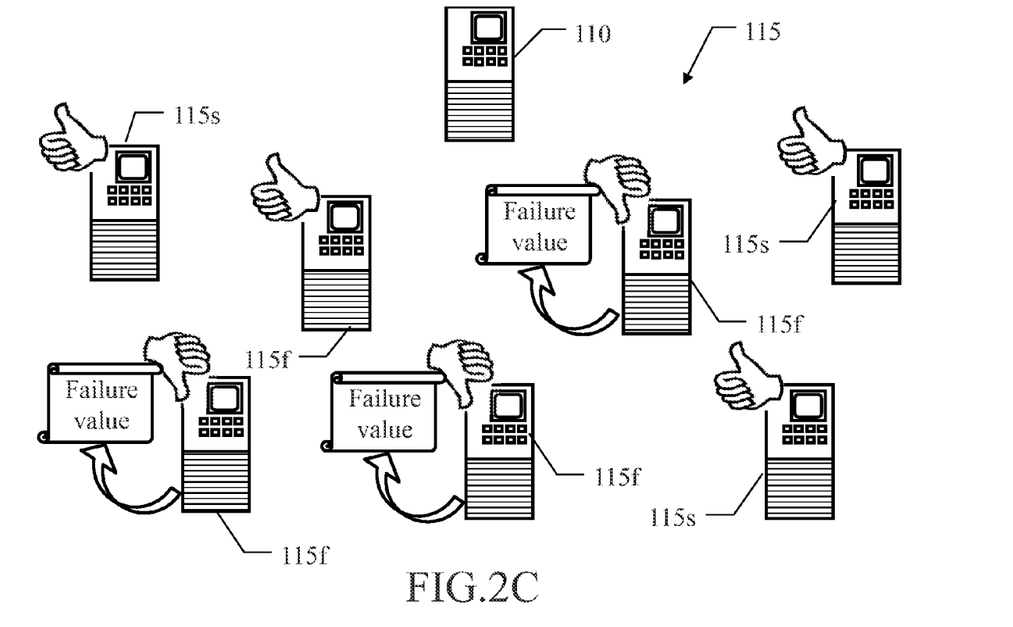

Passing to FIG. 2C, the values of the selected properties of the targets 115 (or at least part thereof) are collected; these values comprise the value of each relevant property for each failure target 115*f*, hereinafter referred to as failure value (for example, the name of its operating system).

Figure 2D:
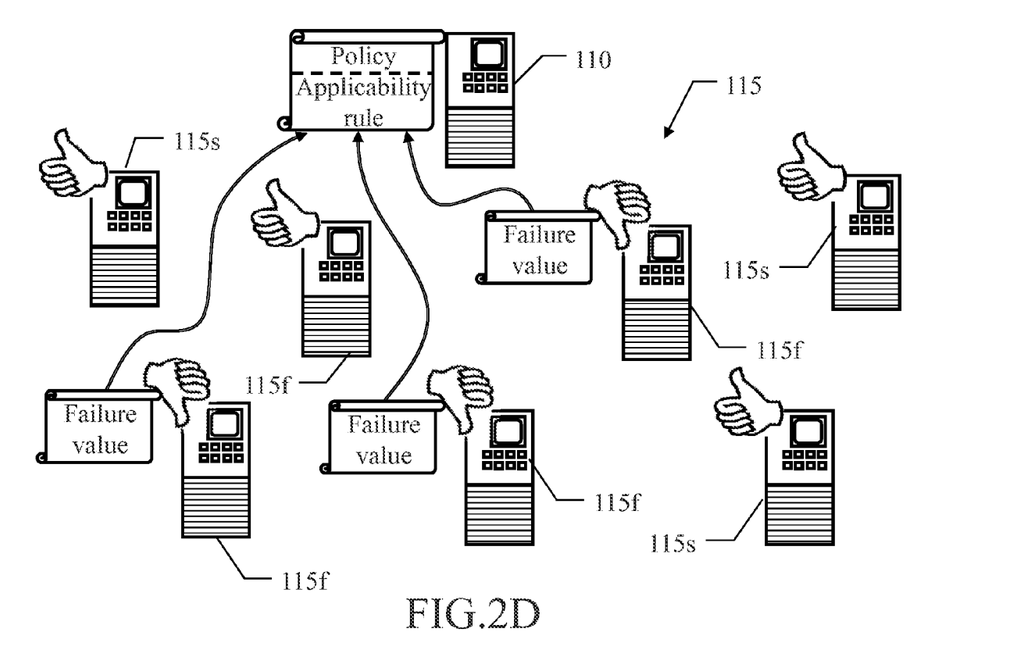

Passing to FIG. 2D, the applicability rule of the policy is updated according to the failure values (for example, by restricting the applicability rule so as to avoid the application of the policy on the targets 115 having the same values of the corresponding relevant properties).

The above-described solution facilitates the definition of the applicability rules, significantly reducing the time required for this task.

Particularly, the applicability rules now self-adapt dynamically according to the result of the deployment of the policy on the targets (in a collaborative way); this result is achieved with no (or at least reduced) manual intervention. As a result, the errors in the applicability rules are significantly reduced; this accordingly reduces the failures in the application of the corresponding policies, and then the time and costs for their troubleshooting (since the failures relate only, or at least mainly, to actual problems that prevented the successful application of the policies where they actually had to be applied).

All of the above has a beneficial effect on the whole management of the targets; indeed, in this way it is possible to reach a stable condition (with accurate applicability rules limiting the failures) in a short time.

Figure 3:
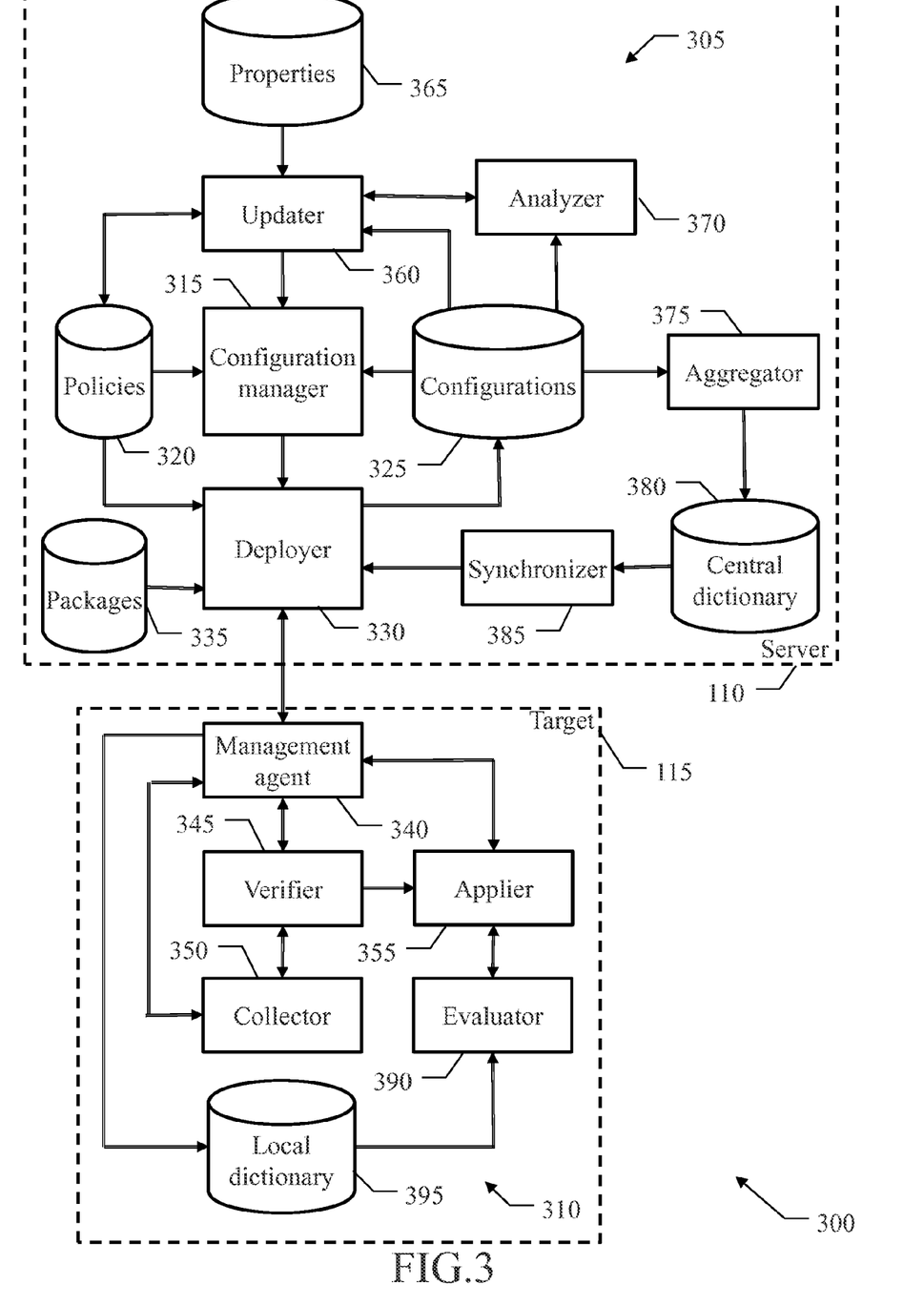
FIG. 3 shows the main software components that may be used to implement the solution according to an embodiment of the present disclosure.

Moving to FIG. 3, the main software components are shown that may be used to implement the solution according to an embodiment of the present disclosure.

All the software components (programs and data) are denoted as a whole with the reference 300. The software components 300 are typically stored in the mass memory and loaded (at least partially) into the working memory of each computing machine 110,115 when the programs are running. The programs are initially installed into the mass memory, for example, from removable storage units or from the network. In this respect, each software component may represent a module, segment or portion of code, which comprises one or more executable instructions for implementing the specified logical function.

Particularly, the computing system runs a resource management tool based on policies (for example, the above-mentioned BigFix), which resource management tool comprises a server-side component 305 running on the server 110 and a target-side component 310 running on each target 115 (only one shown in the figure).

Starting from the server-side component 305, a configuration manager 315 controls the management of the targets 115. For this purpose, the configuration manager 315 controls (in read/write mode) a policy repository 320, which stores one or more policies that are available to manage the targets 115. The policies are defined at high level independently of an actual implementation of the targets 115. Particularly, each policy indicates a management activity that is to be executed on the targets 115 to make then compliant with the policy; for example, the management activity indicates a controlled sequence of management commands (called "actions" in the BigFix) for installing a software product, for upgrading it to a different version, for applying a service pack or a patch thereto. Moreover, the policy indicates an applicability rule (called "relevance" in the BigFix), which defines the targets 115 (fulfilling it) on which the policy has to be applied; for example, the applicability rule may require a minimum frequency of the CPU, a specific operating system or a suitable authorization of a user. The configuration manager 315 also accesses (in read mode only) a configuration repository 325, which stores configuration information of each target 115.

Particularly, the configuration information indicates the values of one or more properties of the target 115; the properties may be any hardware, software and/or logic characteristics of the targets 115 (typically tracked by inventory processes), for example, relating to their operating system, CPU, user. The configuration information then indicates the policies that have been applied on the target 115. For each of these policies, the configuration information indicates whether the application of the policy has succeeded or failed, and then the actual compliance of the target 115 to the policy; when the application of the policy on the target 115 has failed, the configuration information also indicates the corresponding error message. The configuration manager 315 exposes a user interface (for example, a GUI), which may be used by a system administrator to maintain (i.e., create, update, delete) the policies, to enforce their deployment (for example, according to a management plan) and to inspect a status of the targets 115 (as defined by their configuration information).

The configuration manager 315 controls a deployer 330, which is used to deploy the policies to the targets 115 for their application thereon (for example, via an ad-hoc deployment infrastructure, not shown in the figure). For this purpose, the deployer 330 accesses (in read mode only) the policy repository 320 and a package repository 335, which stores packages that are required to apply the policies (for example, comprising the software products to be installed or upgraded, the patches or the service packs to be applied); the deployer 330 also controls (in read/write mode) the configuration repository 325 for updating the configuration information of the targets 115 in response to the application of the policies thereon.

Moving to the target-side component 310, a management agent 340 controls the application of the policies on the target 115. For this purpose, the management agent 340 controls a verifier 345, which is used to verify whether the policies are to be applied on the target 115 (i.e., whether they fulfill the corresponding applicability rules). The verifier 345 in turn exploits a collector 350, which is used to collect the values of the properties of the target 115 required to verify the applicability rules. The verifier 345 controls an applier 355, which enforces the application of the policies on the target 115 (i.e., the execution of the corresponding management activities). The applier 355 interfaces with the management agent 340 to report the result of the application of the policies on the target 115 to the server 110.

The deployer 330 (of the server 110) communicates with the management agent 340 (of each target 115) via management messages. Particularly, the management messages are used to deploy the policies from the server 110 to the target 115 (in this case, called "fixlets" in the BigFix) and to retrieve information of the target 115 by the server 110 (in this case, called "analyses" in the BigFix).

In the solution according to an embodiment of the present disclosure, the server 110 further runs an updater 360, which interfaces with the configuration manager 315 for controlling the update of the applicability rules of the policies dynamically; for this purpose, the updater 360 accesses (in read mode only) the configuration repository 325 and it controls (in read/write mode) the policy repository 320. Moreover, the updater 360 accesses (in read mode only) a property repository 365 that stores a definition of all the (available) properties that may be used to update the applicability rules of the policies dynamically. Particularly, the available properties are organized in property categories, each one comprising property components. The property categories/components are arranged in a property tree starting from a root node. Nodes directly depending from the root node are provided for the property categories, in decreasing order of priority moving from left to right (for example, Operating system, CPU, User); a sub-tree directly depending on the node of each category is provided for its property components, for example:

| Available properties | | | | | |
|---|---|---|---|---|---|
| OperatingSystem | | CPU | | User | |
| Name | Architecture | Clock | Cores | Type | Department |
| Version | | | | | |
| ServiceLevel | | | | | |

An available property is defined for each property component by concatenating its property category with each property component along a path from it to this property component (for example, OperatingSystem.Name.Version. ServiceLevel, CPU. Clock and User.Type); the value of each available property is likewise defined by concatenating the values of its property components (for example, OperatingSystem.Name.Version.ServiceLevel=OSa.2.09).

The updater 360 exploits an analyzer 370 for determining how to update the applicability rules of the policies; for this purpose, the analyzer 370 accesses (in read mode only) the configuration repository 325.

An aggregator 375 further accesses (in read mode only) the configuration repository 325; the aggregator 375 controls (in read/write mode) a central dictionary repository 380, storing a central version of a management dictionary (or simply central dictionary), for updating it according to the error messages received from the targets 115. For each available property, the central dictionary comprises an identification rule for identifying the available property. For example, the identification rule comprises one or more keywords (for example, "library" for the operating system, "frequency" for the CPU, "authorization" for the user); in addition, the identification rule may comprise one or more message templates, each one formed by text with possible wildcard characters that may be substituted by any other characters, like "*" for one or more characters (for example, "command unknown" for the operating system, "frequency * too low" for the CPU, "administrator privileges required" for the user). A synchronizer 385 accesses (in read mode only) the central dictionary repository 380; the synchronizer 385 exploits the deployer 330 to send any updates of the central dictionary to the targets 115.

Each target 115 further runs an evaluator 390 that is controlled by the applier 355. The evaluator 390 is used to determine the relevant properties corresponding to any error messages (resulting from the failures of the application of the policies on the target 115). For this purpose, the evaluator 390 accesses (in read mode only) a local dictionary repository 395; the local dictionary repository 395 stores a local version of the management dictionary (or simply local dictionary). The management agent 340 further exploits the collector 350 to collect the values of the selected properties of the target 115 (comprising its failure values or success values) required to update the applicability rule of the policies dynamically, and it controls (in read/write mode) the local dictionary repository 395 for updating it.

Figure 4A:
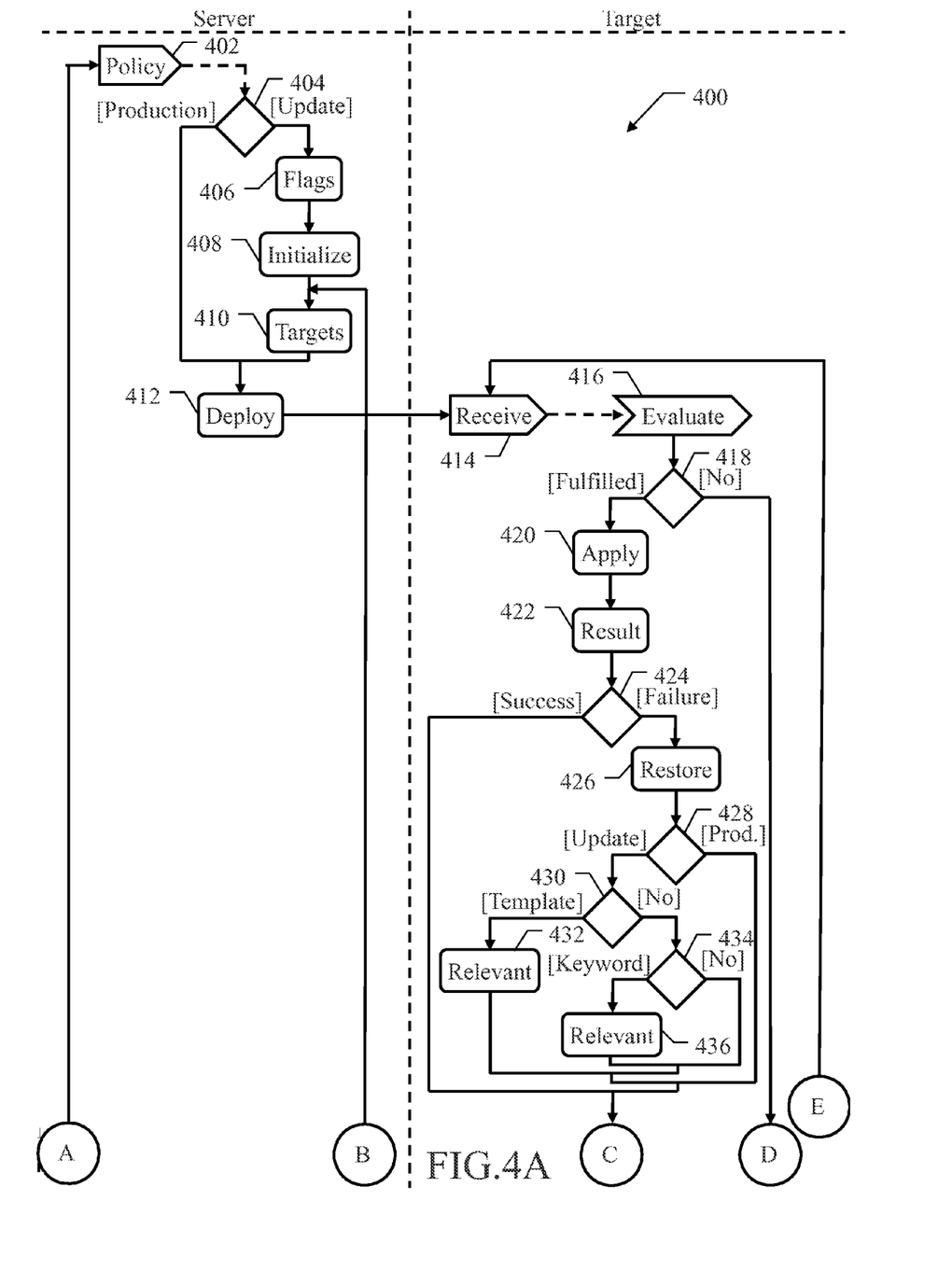
FIGS. 4A-4C show an activity diagram describing the flow of activities relating to an implementation of the solution according to an embodiment of the present disclosure.
Figure 4B:
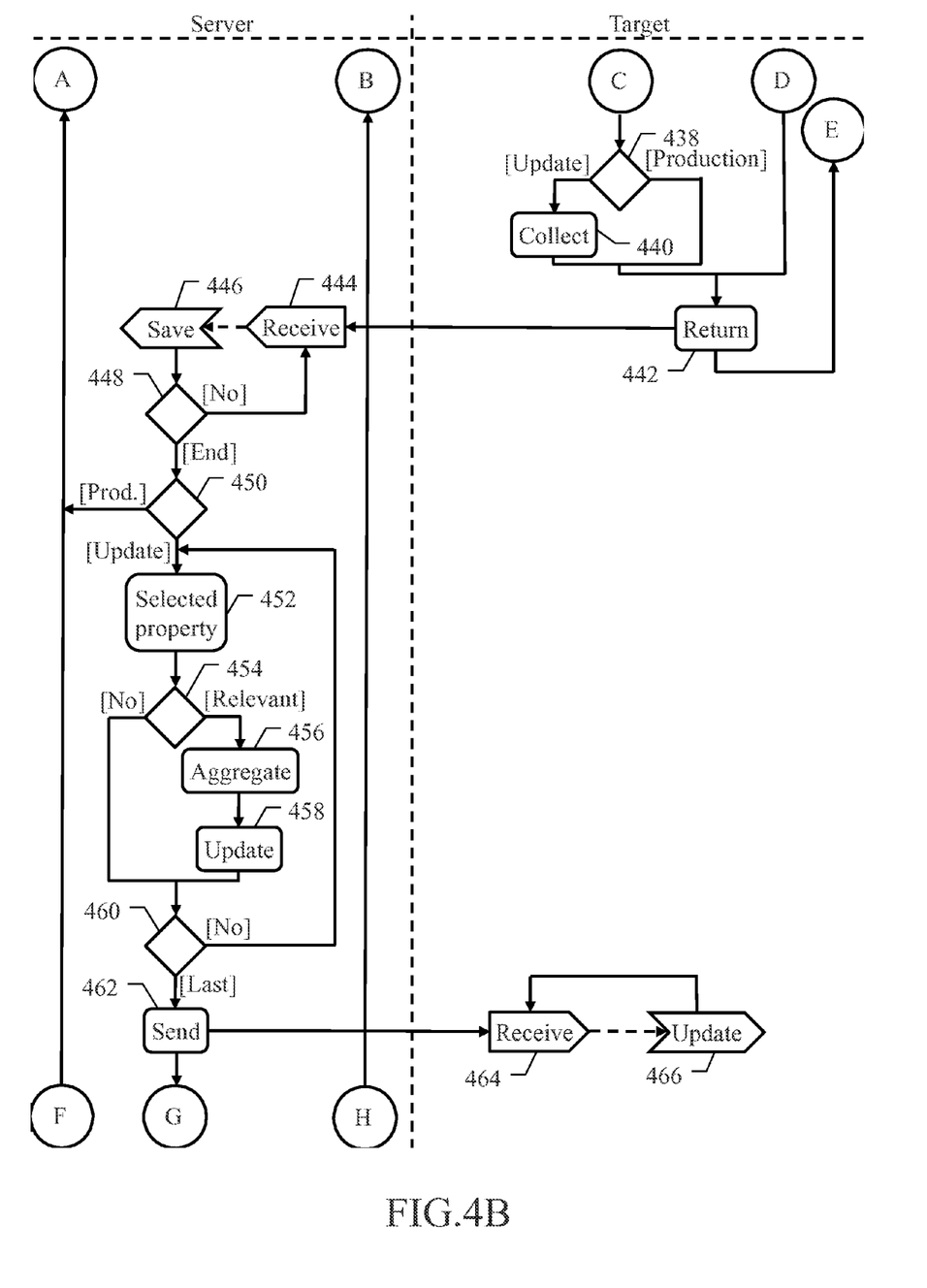
Figure 4C:
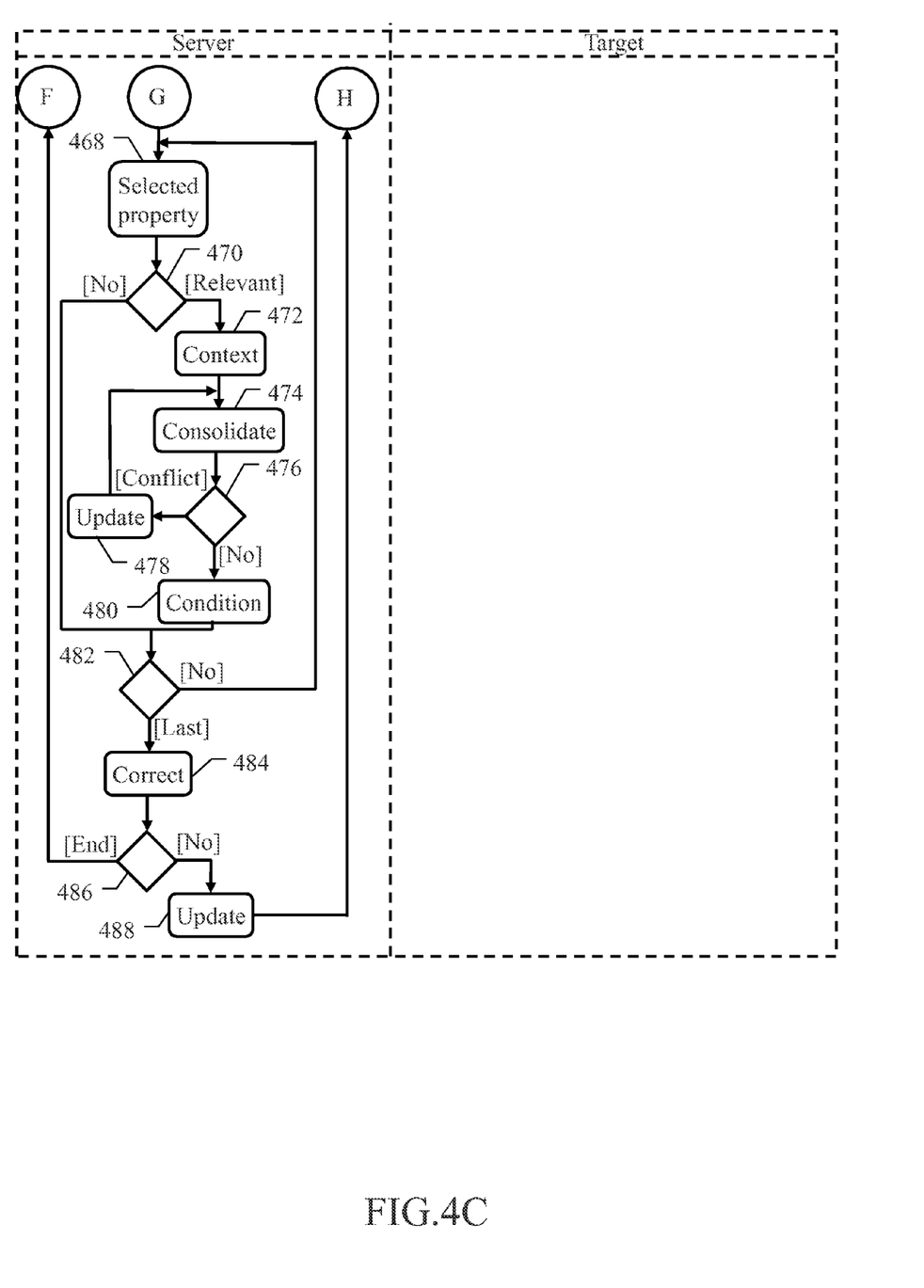

Moving to FIGS. 4A-4C, an activity diagram is shown describing the flow of activities relating to an implementation of the solution according to an embodiment of the present disclosure.

Particularly, the diagram represents an exemplary process that may be used to manage the targets with a method 400. In this respect, each block of the diagram may correspond to one or more executable instructions for implementing the specified logical function on the server and on each target.

The process passes from block 402 to block 404 in the swim-lane of the server as soon as a specific policy has to be deployed; in response thereto, the deployer extracts the policy from the policy repository. The flow of activity then branches at block 404 according to a deployment mode of the policy. Particularly, if the policy has to be deployed in an update mode (for updating its applicability rule dynamically), for example, in response to a corresponding command submitted to the configuration manager by a system administrator, the updater at block 406 flags the policy accordingly (for example, by attaching an update token thereto). Continuing to block 408, the updater initializes the selected properties to be used for the update of the applicability rule (by selecting them among the available properties defined in the property repository). For example, at the beginning a single selected property is taken into account corresponding to the first (left) node directly depending on the first (left) node of the property categories in the property tree (i.e., OperatingSystem.Name in the above-mentioned example). The updater then attaches an indication of the selected properties to the policy. With reference now to block 410, the updater selects the selected targets to which the policy has to be deployed; this operation is performed according to the values of the selected properties in all the targets (extracted from the configuration repository), so as to provide a sub-set thereof that is significant for the update of the applicability rule. For example, the possible values of each selected property in all the targets (i.e., their union) are determined (for example, {OSa,OSb} for OperatingSystem.Name, {1.5,1.8} for CPU.Clock and {End-User} for User.Type). All the possible combinations of these values are then determined (i.e., {OSa, 1.5, End-User}, {OSa,1.8, End-User}, {(OSb,1.5, End-User} and {OSb,1.8, End-User}). For each combination, one or more targets having their values of the corresponding selected properties (if any) are selected. In this way, the policy may be deployed (for the update of its applicability rule) to a relatively low number of targets, with a beneficial effect on the performance but at the same time without adversely affecting the accuracy.

The process then descends into block 412; the same point is also reached directly from the block 404 when the policy has to be deployed in a production mode (to all the targets after the definition of its applicability rule), for example, according to a scheduling thereof in a corresponding management plan. In both cases, the deployer deploys the policy to the corresponding targets, i.e., the selected targets in the update mode or all the targets in the production mode (for example, by submitting the policy to the deployment infrastructure).

Moving to the swim-lane of a generic target, the management agent is listening at block 414 for the deployment of any policy. As soon as a (new) policy is received, the process passes to block 416 wherein the verifier evaluates the applicability rule of the policy; for example, the applicability rule is defined by an expression (written in a so-called relevance language in the BigFix) that combines (for example, with logical operators and/or programming constructs) one or more applicability conditions each one based on one or more available properties of the target (whose values are provided by the collector). The flow of activity then branches according to the result of the evaluation of the applicability rule. Particularly, if the applicability rule is fulfilled (i.e., its expression evaluates to true), the applier at block 420 applies the policy on the target (assuming that the target is not already compliant with the policy, for example, as determined by evaluating a corresponding compliance condition thereof). For this purpose, the applier controls the submission of its management commands (suitably translated into actual commands that may be executed on the target) according to the sequence defined in the corresponding management activity; for example, this may involve the downloading of the package associated with the policy (from the package repository) and its launching, the deletion of files, the updating of configuration parameters. The applier determines the result of the application of the policy at block 422. Particularly, the result indicates whether the application of the policy has succeeded or has failed; in the latter case, the result comprises the corresponding error message.

The flow of activity then branches at block 424 according to the result of the application of the policy. Particularly, if the application of the policy has failed the applier at block 426 rolls-back the management commands executed on the target to restore its condition preceding the application of the policy; in this way, the target is left unchanged without compromising its integrity. A test is then performed at block 428, wherein the applier verifies whether the policy is flagged for the update mode. If so (i.e., when the policy comprises the update token in the example at issue), the evaluator at block 430 verifies whether the error message matches one of the message templates (extracted from the local dictionary) of the selected properties (indicated in the policy). If so, the evaluator at block 432 sets the selected property of this message template as the relevant property for the error message. Conversely, the evaluator at block 434 verifies whether the error message comprises one of the keywords (extracted from the local dictionary) of the selected properties (indicated in the policy). If so, the evaluator at block 436 sets the selected property of this keyword as the relevant property of the error message. In this way, the use of the message templates increases the performance of the search of the relevant property of the error message (since it does not require its parsing); moreover, this improves the reliability of the same search (since it allows determining the relevant property of the error message even when it has been truncated with the removal of the corresponding keywords).

The flow of activity merges again at block 438 from the block 432 or from the block 436, and directly from the block 434 (when the error message does not comprise anyone of the keywords, and then its relevant property remains unknown), from the block 428 (when the policy is not flagged for the update mode) or from the block 424 (when the application of the policy has succeeded). At this point, a test is performed wherein the applier again verifies whether the policy is flagged for the update mode. If so, the collector at block 440 collects the value of each selected property (as indicated in the policy) on the target. The process then continues to block 442; the same point is also reached directly from the block 438 (when the policy is not flagged for the update mode) or from the block 418 (when the policy has not been applied on the target since its applicability rule is not fulfilled or the target is already compliant with the policy). In any case, the management agent now returns a corresponding result to the deployer. Particularly, this result indicates whether the policy has been applied or not on the target; when the policy has been applied, the result indicates whether the application of the policy has succeeded or failed (in the latter case, together with the corresponding error message). In the solution according to an embodiment of the present disclosure, when the policy has been applied in the update mode and its application has failed, the result further comprises an indication of the corresponding relevant property (if found); moreover, in this case the target further returns (for example, in response to a corresponding management message sent by the server) the values of the selected properties. The flow of activity then returns to the block 414 waiting for the deployment of a further (new) policy.

Referring back to the swim-lane of the server, the deployer is listening at block 444 for the results of the application of the policy on the corresponding targets. As soon as a (new) result is received, the process passes to block 446 wherein the deployer updates the configuration repository accordingly. A test is then made at block 448, wherein the deployer verifies whether the deployment of the policy has been completed (for example, after receiving all the corresponding results or in any case after a pre-defined time limit). If not, the process returns to the block 444 waiting for a further (new) result.

Conversely, the process descends into block 450, wherein the flow of activity branches according to the deployment mode of the policy. Particularly, if the policy has been deployed in the production mode, the flow of activity directly returns to the block 402 waiting for the deployment of a further policy. Conversely, if the policy has been deployed in the update mode a loop is entered for updating the central dictionary according to the error messages received from the targets. The loop begins at block 452, wherein the aggregator takes a (current) selected property into account (starting from a first one in any arbitrary order). The aggregator then verifies at block 454 whether the selected property has been determined to be the relevant property of one or more error messages. If so, the aggregator at block 456 aggregates the error messages corresponding to this relevant property into one or more aggregated messages; for example, each set of one or more (similar) error messages having a common text and differing only for a few characters likely relating to a contingent condition of the corresponding targets (for example, representing a number) are aggregated into an aggregated message having the same text and the differing characters replaced by a corresponding wildcard (for example, "frequency * too low" for "frequency 1 GHz too low", "frequency 1.1 GHz too low" and "frequency 1.2 GHz too low"). Continuing to block 458, the aggregator updates the central repository accordingly, by adding each aggregated message (if necessary) for the relevant property. In this way, the central dictionary populates automatically over time (for example, starting from an initial version thereof wherein each available property is simply defined by its keywords). The process then descends into block 460; the same point is also reached directly from the block 454 when the selected property has not been determined to be the relevant property of any error message. In both cases, the aggregator now verifies whether a last selected property has been processed. If not, the flow of activity returns to the block 452 to repeat the same operations on a next selected property. Conversely, once all the selected properties have been processed, the loop is exit by descending into block 462. At this point, the synchronizer sends the update of the central dictionary (if any) to all the targets.

Moving to the swim-lane of a generic target, the management agent is listening at block 464 for any update of the local dictionary. As soon as a (new) update is received, the process passes to block 466 wherein the management agent updates the local dictionary accordingly (i.e., by adding the corresponding update of the central dictionary). The flow of activity then returns to the block 464 waiting for a further (new) update for the local dictionary.

Referring back to the swim-lane of the server, at the same time the process enters a further loop from the block 462 for updating the applicability rule of the policy. The loop begins at block 468, wherein the analyzer takes a (current) selected property into account (starting from a first one in any arbitrary order). The analyzer then verifies at block 470 whether the selected property has been determined to be the relevant property of one or more error messages. If so, the analyzer at block 472 initializes a failure context relating to the application of the policy. The failure context is defined by one or more context properties and a corresponding context element; at the beginning, the analyzer sets the context properties equal to the relevant property. An inner loop is then entered for processing the failure context. The loop begins at block 474, wherein the analyzer consolidates the failure values of the context properties into the context element. For this purpose, a compound value composed by the values of all the context properties is determined for each failure target. In this phase, the value of each context property being measurable is replaced with a range of values; particularly, the range of values is set lower than or equal to the value of the context property when it is positive, meaning that the higher the better (like for the frequency of the CPU), or it is set higher than or equal to the value of the context property when it is negative, meaning that the lower the better (like for a latency of the mass memory). The context element is then set to the union of these compound elements (for example, {OSa,≤1.2} for {OSa,1.0}, {OSa, 1.2} and {OSa,1.1}.

The analyzer at block 476 verifies whether a property conflict exists between the failure context and the values of the selected properties for the success targets, hereinafter referred to as success values; this happens when at least one of the success target has its success values of all the context properties comprised in the context element. If so (meaning that the failure context is not capable of discriminating the failure targets from the success targets), the analyzer at block 478 updates the failure context in an attempt to remove the property conflict. For example, the analyzer selects a new node in the property tree (not comprised in the paths of the context properties already comprised in the failure context); the new node is selected by traversing the property tree along a level-order walk, wherein its nodes are visited level by level descending from the root node, starting from its first left node followed by any sibling nodes moving rightwards for each level. If the new node directly depends on the node of a context property that is already comprised in the failure context, this context property is replaced with the available property corresponding to the new node (for example, by replacing OperatingSystem.Name with OperatingSystem.Name.Version); otherwise, the available property corresponding to the new node is added to the context properties (for example, by adding CPU.Clock to OperatingSystem. Architecture). At this point, the process returns to the block 474 to repeat the same operations described above.

Referring back to the block 476, the loop is exit by descending into block 480 as soon as the property conflict does not exist any longer, meaning that the failure context now identifies the failure targets unambiguously (assuming that this is always possible for the sake of simplicity). For example, the property conflict occurs in the following situation:

| Failure context | | Success values |
| --- | --- | --- |
| Context properties | Context element | 1.8 |
| CPU.Clock | (≤1.2) | 1.0 |
| | | 1.5 |

The property conflict persists even when the failure context becomes:

| Failure context | | Success values | |
| --- | --- | --- | --- |
| Context properties | Context element | 1.8 | OSb |
| CPU.Clock | (≤1.2, OSa) | 1.0 | OSa |
| OperatingSystem.Name | | 1.5 | OSa |

However, the property conflict is removed when the failure context becomes:

| Failure context | | Success values | |
| --- | --- | --- | --- |
| Context properties | Context element | 1.8 | OSb. 1 |
| CPU.Clock | (≤1.2, OSa. 1) | 1.0 | OSa. 2 |
| OperatingSystem.Name.Version | | 1.5 | OSa. 2 |

At this point, the analyzer determines a (new) applicability condition corresponding to the failure context (i.e., capable of avoiding the application of the policy on the failure targets corresponding to the failure context); for example, the new applicability condition is obtained by negating the context element, with its components in logical AND (i.e., NOT(CPU.Clock≤1.2 AND OperatingSystem.Name.Version=OSa.1) in the example at issue). The analyzer then initializes a rule correction to the new applicability condition at the beginning, or it adds the new applicability condition in logic AND to the rule correction otherwise. The process now descends into block 482; the same point is also reached directly from the block 470 when the selected property has not been determined to be the relevant property of any error message. In both cases, the analyzer verifies whether a last selected property has been processed. If not, the flow of activity returns to the block 468 to repeat the same operations on a next selected property. Conversely, once all the selected properties have been processed, the loop is exit by descending into block 484. At this point, the updater sets the applicability rule of the policy (in the central dictionary) to the rule correction if the applicability rule is missing or it adds the rule correction in logic AND to the applicability rule otherwise. The flow of activity then branches at block 486, wherein the updater verifies whether the update of the applicability rule has been completed (for example, when its application has succeeded on all the selected targets or in any case after all the available properties have been selected). If not, the process descends into block 488, wherein the updater selects a new node in the property tree; the new node is selected by moving from the node of the last property that has been selected along the same level-order walk as above. If the new node directly depends on the node of a selected property, this selected property is replaced with the available property corresponding to the new node; otherwise, the available property corresponding to the new node is added to the selected properties. At this point, the flow of activity returns to the block 410 to repeat the same operations described above. In this way, the applicability rule is refined incrementally starting from a very simple applicability rule (down to none at all); particularly, at each iteration more and more detailed applicability conditions are added (for example, applicability conditions relating to operating systems, their versions and then service levels). Referring back to the block 488, once the update of the applicability rule has been completed the flow of activity returns to the block 402 waiting for the deployment of a further policy.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a plurality of computing machines. However, the management of the computing machines may be of any type (for example, for asset inventory/discovery, security vulnerability detection/remediation, software license control) and it may be implemented under the control of any system (see below); moreover, the computing machines may be in any number and of any physical and/or virtual type (for example, other servers, tablets, Point Of Sale (POS) devices, Automated Teller Machines (ATMs), self-service kiosks).

In an embodiment, the method comprises deploying an indication of a management activity having an applicability rule. However, the management activity may be deployed in any way (even without any dedicated deployment infrastructure); moreover, the management activity with its applicability rule may be defined in any way, even not in the form of a policy (for example, by a script).

In an embodiment, the indication of the management activity is deployed to selected one or more of the computing machines. However, the computing machines may be selected in any number and in any way (see below); in any case, the possibility of applying the method to all the computing machines, always or only when their number is lower than a predefined threshold, is not excluded.

In an embodiment, the deployment of the indication of the management activity causes each of the selected computing machines fulfilling the applicability rule to execute the management activity on the selected computing machine. However, the execution of the management activity may be enforced in any way (for example, with the server that triggers the evaluation of the policies on all the targets or with the targets that periodically retrieve the policies to be applied thereon). The management activity may be of any type (for example, the downloading of data, the acquisition of a license entitlement) and it may be executed in any way (for example, by invoking APIs, executable programs). Moreover, the applicability rule may be defined in any way (for example, by a query) and its fulfillment may be verified in any way (for example, directly by the server).

In an embodiment, the method comprises receiving an error message for each failure computing machine of the selected computing machines wherein the execution of the management activity has failed. However, the error message may be received in any way (for example, by polling the targets under the control of the server); moreover, the failed execution of the management activity may be determined in any way (for example, only in response to severe errors) and the error message may comprise any information (for example, a time-stamp, a return code).

In an embodiment, the method comprises determining at least one relevant property of each failure computing machine among a plurality of selected properties of the computing machines according to the corresponding error message. However, the selected properties may be in any number and of any type (see below); moreover, the relevant properties may be in any number for each error message and they may be determined in any way according thereto (for example, directly by the server).

In an embodiment, the method comprises collecting a value of at least part of the selected properties for at least part of the computing machines; the values of the selected properties comprise a failure value of each relevant property for each failure computing machine. However, the values may be of any type (for example, numbers, ranges, strings); moreover, any number of values (from the ones of all the selected properties down to the failure values only) may be collected in any way (for example, periodically by the server).

In an embodiment, the method comprises updating the applicability rule according to the failure values. However, the applicability rule may be updated in any way (for example, by generating a command to be applied thereto), either automatically or always requiring a manual confirmation.

In an embodiment, the method comprises further deploying the indication of the management activity having the updated applicability rule to the computing machines to cause each of the computing machines fulfilling the updated applicability rule to execute the management activity on the computing machine. However, the update of the applicability rule and the further deployment of the management activity may be performed either in the same environment or in different environments (for example, with the applicability rule that is updated in a test environment before the deployment of the management activity in a production environment).

In an embodiment, the values of the selected properties comprise a success value of each relevant property for each success computing machine wherein the application of the policy has succeeded. However, the successful execution of the management activity may be determined in any way (for example, comprising when the corresponding return code simply indicates a warning).

In an embodiment, said step of updating the applicability rule comprises, for each relevant property, restricting the applicability rule according to the failure values in view of the success values of the relevant property. However, the applicability rule may be restricted in any way, even independently of the success values (for example, by inference techniques).

In an embodiment, said step of updating the applicability rule comprises, for each relevant property, determining a failure context according to a consolidation of the failure values of the relevant property. However, the failure context may be determined in any way (for example, by only taking into account consistent failure values in a number higher than a threshold).

In an embodiment, said step of updating the applicability rule comprises, for each relevant property, verifying a property conflict between the success values and the failure context of the relevant property. However, the property conflict may be verified in any way (see below).

In an embodiment, said step of updating the applicability rule comprises, for each relevant property, restricting the applicability rule according to the failure context in response to an absence of the property conflict. However, the applicability rule may be restricted in any way (for example, by extrapolating new applicability conditions to be added to the applicability rule corresponding to the success values).

In an embodiment, said step of verifying a property conflict comprises verifying the property conflict according to an inclusion of each success value in the failure context. However, the inclusion of the success values in the failure context may be verified in any way (for example, by detecting it only when the number of occurrences reaches a threshold).

In an embodiment, the values are of all the selected properties for all the selected computing machines; said step of updating the applicability rule comprises, in response to a presence of the property conflict, updating the failure context according to the values of one or more of the selected properties different from the relevant property to remove the property conflict. However, the failure context may be updated in any way (for example, by adding and/or replacing any number of selected properties in any way, such as only at the same level in the property tree), even stopping it when a predefined end point is reached (irrespectively of the removal of the property conflict).

In an embodiment, the values are of all the selected properties for all the computing machines; the method comprises selecting the selected computing machines according to the values of the selected properties in the computing machines. However, the selected computing machines may be selected in any way (for example, by statistical analysis techniques), even independently of the values of the selected properties in the computing machines (for example, random).

In an embodiment, the method comprises updating the selected properties by choosing among a plurality of available properties of the computing machines, and repeating said step of deploying an indication of a management activity, said step of receiving an error message, said step of determining at least one relevant property, said step of collecting a value and said step of updating the applicability rule after said step of updating the selected properties.

However, the available properties (and then the selected properties as well) may be in any number, of any nature (for example, only hardware, only software, only logic or any combination thereof) and of any type (for example, installed software programs, mass memory size, network domain); moreover, the selected properties may be updated in any way (see below) and the method may be reiterated in any way (for example, by repeating it two or more times for the same selected properties, by stopping the reiteration when any other stability condition is reached), down to executing the method only once.

In an embodiment, the available properties are defined by a plurality of property components. However, the available properties may be defined by any number and types of components (for example, vendor for the CPU, distribution type for the operating system, role for the user); in any case, the available properties may be independent (totally or in part), without sharing any property components.

In an embodiment, said step of updating the selected properties comprises adding at least one further property component to at least one of the selected properties. However, any number of further property components may be added in any way, either by replacing a selected property or by creating a new one (for example, random).

In an embodiment, the property components are organized in one or more hierarchical structures; said step of adding at least one further property component comprises adding each further property component to a corresponding one of the selected properties according to the corresponding hierarchical structure. However, the hierarchical structures may be in any number (for example, one for each property category) and of any type (for example, a simple list for each property category); in any case, any other organization of the property components is contemplated (down to none at all).

In an embodiment, said step of determining at least one relevant property comprises determining said at least one relevant property of each failure computing machine according to a comparison of the corresponding error message with one or more keywords associated with each selected property. However, any number and type of keywords may be associated with each selected property, and the relevant properties may be determined accordingly in any way (for example, only when a predefined number of keywords, possibly in a predefined order, are found in the error message); moreover, the keywords may be provided in any way (for example, dynamically according to the error messages).

In an embodiment, said step of determining at least one relevant property comprises determining said at least one relevant property of each failure computing machine according to a comparison of the corresponding error message with one or more message templates associated with each selected property. However, any number and type of message templates may be associated with each selected property (for example, with different wildcards or none at all), and the relevant properties may be determined accordingly in any way (for example, only when the error message comprises a predefined percentage of a message template).

In an embodiment, the method comprises aggregating the error messages corresponding to each relevant property into one or more aggregated messages. However, the error messages may be aggregated in any way (for example, only when the number of similar error messages reaches a threshold).

In an embodiment, the method comprises updating the message templates associated with each selected property according to the corresponding aggregated messages. However, the message templates may be updated in any may (for example, only when the same aggregated messages are obtained repeatedly in two or more iterations); moreover, the message templates may be provided in any way (for example, statically by predefining them).

In any way, the relevant properties may be determined in different, alternative or additional ways (for example, only with the keywords, only with the message templates, with both of them, with fuzzy logic techniques).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions executable by a computing system to cause the computing system to perform the same method. However, the computer program may be implemented as a stand-alone module, as a plug-in for a pre-existing software application (for example, the resource management tool), or even directly in the latter.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment provides a system comprising means configured for performing the steps of the above-mentioned method. An embodiment provides a system for managing a plurality of computing machines: the system comprises a circuitry (i.e., a hardware suitably configured, for example, by software) for deploying an indication of a management activity having an applicability rule to selected one or more of the computing machines to cause each of the selected computing machines fulfilling the applicability rule to execute the management activity on the selected computing machine, a circuitry for receiving an error message for each failure computing machine of the selected computing machines wherein the execution of the management activity has failed, a circuitry for determining at least one relevant property of each failure computing machine among a plurality of selected properties of the computing machines according to the corresponding error message, a circuitry for collecting a value of at least part of the selected properties for at least part of the computing machines, the values of the selected properties comprising a failure value of each relevant property for each failure computing machine, and a circuitry for updating the applicability rule according to the failure values.

However, the method may also be implemented on any other computing system (for example, with the addition of a separate software distribution server for deploying the policies) based on a different architecture (for example, a local, wide area, global, cellular or satellite network), and exploiting any type of (wired and/or wireless) connections. However, its implementation on a stand-alone computer (for managing its virtual machines) is not excluded.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The above-described features may be combined in any way. For example, possible combinations are claim 2 with claim 1, claim 3 with claim 1 or 2, claim 4 with claim 3, claim 5 with claim 4, claim 6 with claim 4 or 5, claim 7 with any claim from to 6, claim 8 with any claim from 1 to 7, claim 9 with claim 8, claim 10 with claim 9, claim 11 with any claim from 1 to 10, claim 12 with any claim from 1 to 11 and claim 13 with claim 12.

What is claimed is:

1. A method for managing a plurality of computing machines, the method comprising:
deploying an indication of a management activity having an applicability rule to selected one or more of the computing machines to cause each of the selected computing machines fulfilling the applicability rule to execute the management activity on the selected computing machine, the management activity being executed on a selected one or more of the computing machines to make the selected one or more computing machines compliant with a policy, the applicability rule indicating whether to apply the policy to the selected one or more computing machines when the selected one or more computing machines fulfill the applicability rule,
receiving an error message for each failure computing machine of the selected computing machines wherein the execution of the management activity has failed,
determining at least one relevant property of each failure computing machine among a plurality of selected properties of the computing machines according to the corresponding error message,
collecting a value of the at least one relevant property of each failure computing machine among the selected properties of the computing machines, the value of the at least one relevant property of each failure computing machine among the selected properties of the computing machines comprising a failure value of each relevant property for each failure computing machine, and
updating the applicability rule according to the failure values; and wherein
the values of the selected properties comprise a success value of each relevant property for each success computing machine wherein the application of the policy has succeeded, said updating the applicability rule comprising, for each relevant property:
restricting the applicability rule according to the failure values in view of the success values of the relevant property,
said updating the applicability rule comprises, for each relevant property:
determining a failure context according to a consolidation of the failure values of the relevant property,
verifying a property conflict between the success values of the relevant property and the failure context, and
restricting the applicability rule according to the failure context in response to an absence of the property conflict.

2. The method according to claim 1, comprising:
further deploying the indication of the management activity having the updated applicability rule to the computing machines to cause each of the computing machines fulfilling the updated applicability rule to execute the management activity on the computing machine.

3. The method according to claim 1, wherein said verifying a property conflict comprises:
verifying the property conflict according to an inclusion of each success value in the failure context.

4. The method according to claim 1, wherein the values are of all the selected properties for all the selected computing machines, said updating the applicability rule comprising, in response to a presence of the property conflict:
updating the failure context according to the values of one or more of the selected properties different from the relevant property to remove the property conflict.

5. The method according to claim 1, wherein the values are of all the selected properties for all the computing machines, the method comprising:
selecting the selected computing machines according to the values of the selected properties in the computing machines.

6. The method according to claim 1, comprising:
updating the selected properties by choosing among a plurality of available properties of the computing machines, and
repeating said deploying an indication of a management activity, said receiving an error message, said determining at least one relevant property, said collecting a value and said updating the applicability rule after said updating the selected properties.

7. The method according to claim 6, wherein the available properties are defined by a plurality of property components, said updating the selected properties comprising:
adding at least one further property component to at least one of the selected properties.

8. The method according to claim 7, wherein the property components are organized in one or more hierarchical structures, said adding at least one further property component comprising:
adding each further property component to a corresponding one of the selected properties according to the corresponding hierarchical structure.

9. The method according to claim 1, wherein said determining at least one relevant property comprises:
determining said at least one relevant property of each failure computing machine according to a comparison of the corresponding error message with one or more keywords associated with each selected property.

10. The method according to claim 1, wherein said determining at least one relevant property comprises:
determining said at least one relevant property of each failure computing machine according to a comparison of the corresponding error message with one or more message templates associated with each selected property.

11. The method according to claim 10, comprising:
aggregating the error messages corresponding to each relevant property into one or more aggregated messages, and
updating the message templates associated with each selected property according to the corresponding aggregated messages.

12. A computer program product, the computer program product comprising a computer readable storage medium having program instructions embodied therewith, the program instructions executable by a computing system to cause the computing system to perform a method for managing a plurality of computing machines, the method comprising:
deploying an indication of a management activity having an applicability rule to selected one or more of the computing machines to cause each of the selected computing machines fulfilling the applicability rule to execute the management activity on the selected computing machine, the management activity being executed on a selected one or more of the computing machines to make the selected one or more computing machines compliant with a policy, the applicability rule indicating whether to apply the policy to the selected one or more computing machines when the selected one or more computing machines fulfill the applicability rule, receiving an error message for each failure computing machine of the selected computing machines wherein the execution of the management activity has failed, determining at least one relevant property of each failure computing machine among a plurality of selected properties of the computing machines according to the corresponding error message, collecting a value of the at least one relevant property of each failure computing machine among the selected properties of the computing machines, the value of the at least one relevant property of each failure computing machine among the selected properties of the computing machines comprising a failure value of each relevant property for each failure computing machine, and updating the applicability rule according to the failure values; and wherein the values of the selected properties comprise a success value of each relevant property for each success computing machine wherein the application of the policy has succeeded, said updating the applicability rule comprising, for each relevant property:
  restricting the applicability rule according to the failure values in view of the success values of the relevant property, said updating the applicability rule comprises, for each relevant property:
  determining a failure context according to a consolidation of the failure values of the relevant property,
  verifying a property conflict between the success values of the relevant property and the failure context, and
  restricting the applicability rule according to the failure context in response to an absence of the property conflict.

13. A system for managing a plurality of computing machines, the system comprising:
  a circuitry for deploying an indication of a management activity having an applicability rule to selected one or more of the computing machines to cause each of the selected computing machines fulfilling the applicability rule to execute the management activity on the selected computing machine, the management activity being executed on a selected one or more of the computing machines to make the selected one or more computing machines compliant with a policy, the applicability rule indicating whether to apply the policy to the selected one or more computing machines when the selected one or more computing machines fulfill the applicability rule, a circuitry for receiving an error message for each failure computing machine of the selected computing machines wherein the execution of the management activity has failed, a circuitry for determining at least one relevant property of each failure computing machine among a plurality of selected properties of the computing machines according to the corresponding error message, a circuitry for collecting a value of the at least one relevant property of each failure computing machine among the selected properties of the computing machines, the value of the at least one relevant property of each failure computing machine among the selected properties of the computing machines comprising a failure value of each relevant property for each failure computing machine, and a circuitry for updating the applicability rule according to the failure values; and wherein the values of the selected properties comprise a success value of each relevant property for each success computing machine wherein the application of the policy has succeeded, said updating the applicability rule comprising, for each relevant property:
    restricting the applicability rule according to the failure values in view of the success values of the relevant property, said updating the applicability rule comprises, for each relevant property:
    determining a failure context according to a consolidation of the failure values of the relevant property,
    verifying a property conflict between the success values of the relevant property and the failure context, and
    restricting the applicability rule according to the failure context in response to an absence of the property conflict.

14. The computer program product according to claim 12, wherein said verifying a property conflict comprises:
  verifying the property conflict according to an inclusion of each success value in the failure context.

15. The computer program product according to claim 12, wherein the values are of all the selected properties for all the selected computing machines, said updating the applicability rule comprising, in response to a presence of the property conflict:
  updating the failure context according to the values of one or more of the selected properties different from the relevant property to remove the property conflict.

16. The system according to claim 13, wherein said verifying a property conflict comprises:
  verifying the property conflict according to an inclusion of each success value in the failure context.

17. The system according to claim 13, wherein the values are of all the selected properties for all the selected computing machines, said updating the applicability rule comprising, in response to a presence of the property conflict:
  updating the failure context according to the values of one or more of the selected properties different from the relevant property to remove the property conflict.

* * * * *